United States Patent
Pasala et al.

(10) Patent No.: US 10,360,946 B1
(45) Date of Patent: Jul. 23, 2019

(54) AUGMENTING CONTENT WITH INTERACTIVE ELEMENTS

(71) Applicant: GameCommerce, Inc., Sunnyvale, CA (US)

(72) Inventors: Jayaprakash Pasala, Sacramento, CA (US); Sudhir Subramanian, San Ramon, CA (US); Andrew Jasper, San Diego, CA (US); Nageswara Pobbathi, San Jose, CA (US)

(73) Assignee: GameCommerce, Inc., Sunnyvale, CA (US)

( * ) Notice: Subject to any disclaimer, the term of this patent is extended or adjusted under 35 U.S.C. 154(b) by 0 days.

(21) Appl. No.: 16/112,206

(22) Filed: Aug. 24, 2018

(51) Int. Cl.
| | |
|---|---|
| *H04N 9/80* | (2006.01) |
| *G11B 27/036* | (2006.01) |
| *G06F 3/0481* | (2013.01) |
| *G06K 9/20* | (2006.01) |
| *G06K 9/00* | (2006.01) |
| *G11B 27/34* | (2006.01) |
| *H04N 21/81* | (2011.01) |

(52) U.S. Cl.
CPC .......... *G11B 27/036* (2013.01); *G06F 3/0481* (2013.01); *G06K 9/00718* (2013.01); *G06K 9/2081* (2013.01); *G11B 27/34* (2013.01); *H04N 21/812* (2013.01); *G06K 2209/27* (2013.01)

(58) Field of Classification Search
CPC .... G11B 27/036; G11B 27/34; H04N 21/812; G06K 9/00718; G06K 9/2081; G06K 2209/27; G06F 3/0481

USPC .......................................... 386/249–251, 282
See application file for complete search history.

(56) References Cited

U.S. PATENT DOCUMENTS

| | | | |
|---|---|---|---|
| 2007/0028172 A1* | 2/2007 | Greer | H04L 41/22 715/705 |
| 2007/0157249 A1* | 7/2007 | Cordray | G06F 3/0482 725/58 |
| 2011/0060993 A1* | 3/2011 | Cotter | H04N 21/2743 715/720 |
| 2012/0144417 A1* | 6/2012 | Khader | H04N 21/2221 725/32 |
| 2013/0038613 A1* | 2/2013 | Kim | H04M 1/72555 345/473 |
| 2015/0037009 A1* | 2/2015 | Wang | H04N 5/76 386/248 |
| 2015/0220249 A1* | 8/2015 | Snibbe | G06F 3/0412 715/719 |
| 2016/0078490 A1* | 3/2016 | Tumen | G06Q 30/0269 705/14.66 |
| 2016/0360160 A1* | 12/2016 | Eizenberg | G06Q 30/0207 |
| 2017/0294212 A1* | 10/2017 | Allen | G11B 27/031 |
| 2018/0300036 A1* | 10/2018 | Bhatt | G11B 27/34 |

* cited by examiner

*Primary Examiner* — Helen Shibru
(74) *Attorney, Agent, or Firm* — Polsinelli LLP

(57) ABSTRACT

The systems and methods are directed towards implementing interactive elements into content (e.g. video). The present disclosure also describes an application that facilitates user implementation of the interactive elements into content (e.g. video). The implementations of interactive elements are useful, for example, in encouraging user interaction with the content as well as providing the user with additional information related to the content.

19 Claims, 11 Drawing Sheets

AUGMENTING CONTENT WITH INTERACTIVE ELEMENTS

BACKGROUND

Field of Invention

The present invention generally relates to augmenting digital content. More specifically, the present invention relates to augmenting existing digital content files with interactive elements.

Description of the Related Art

Content files, such as images or video file, are generally provided to users for passive viewing. However, passively viewing content (e.g. advertisements) may not be particularly impactful or informative regarding the subject of the content file. Furthermore, passive viewing is generally associated with less interest, less engagement, and less influence. For example, content (e.g., an advertisement) may include images or video that provide a set amount of information that users (e.g., consumers) may observe about a product or service. However, because many users are bombarded with advertisements on a daily basis, users are generally desensitized when advertisements are shown and can easily ignore and disregard its contents, even if the advertisements may be related to subject matter that is of interest to the user. There is a need for tools and services that allow for incorporation of features into content (e.g., advertisements) to enhance such content and encourage user interaction, thereby not only differentiating the content from other non-interactive content but also changing the user from being a passive viewer to an active participant.

Moreover, there is a need for tools and services that allow for continuing updates to be made to augmentation elements (e.g., data, images, interactive cue objects, and other content associated with a primary content file). For example, an advertisement for a product may be of interest to the user. However, there may be situations where new information may arise or related information may change during the life cycle of the product. Such information may not be included in the initial advertisement. Further, some information may be relevant to one user but not to another user. Furthermore, there is a need for content producers to be able to provide the additional information for users—especially in situations where subsequent new questions are raised about a product without having to create entirely new content.

SUMMARY OF THE CLAIMED INVENTION

Embodiments of the present invention include a method for augmenting content with interactive elements. The method includes uploading content that will be augmented with interactive elements. The uploaded content is then processed in order to generate a timeline that includes a plurality of images. A period of time can be defined associated with the timeline that includes at least one cue object of which the interactive element will be associated with. The cue object is identified at a first time during the time period and is associated with the interactive element. Additional information can also be associated with the cue object through the interactive element. Afterwards, other occurrences of the cue object are located within the content during the period of time. These other occurrences are also associated with the same interactive element. Metadata is generated that includes information regarding the content and the associated interactive element. The augmented content is generated based on the combination of the uploaded content and the generated metadata.

Embodiments of the present invention also include a system for augmenting content with interactive elements. The system includes a content window that stores content to be augmented. The system also includes a server that stores instructions executed by a processor to receive the content to be augmented, process the content in order to generate a timeline that includes a plurality of images, and define a period of time associated with the timeline that includes at least one cue object of which the interactive element will be associated with. The processor also identifies the cue object at a first time, associates the cue object with an interactive element and associated additional information, locates other occurrences of the cue object during the period of time, and associates the same interactive element with the other occurrences. The processor finally generates metadata that includes information regarding the association of the interactive elements with the content and generates the augmented content based on the content and the metadata. The system also includes a user computing device from where the augmented content can be displayed for users to view, receive user input that triggers interactive elements within the augmented content, and displaying the additional information associated with the triggered interactive element.

Yet further embodiments of the present invention may include non-transitory computer-readable storage media having embodied thereon a program executable by a processor to perform a method for augmenting content with interactive elements as described above.

DETAILED DESCRIPTION

The present disclosure describes methods and systems directed at implementing interactive elements into content (e.g. video). The present disclosure also describes an application that facilitates user implementation of the interactive elements into content (e.g. video). The implementations of interactive elements may provide additional information related to the content, as well as allow for greater user interaction and enjoyment by way of games.

Figure 1A:
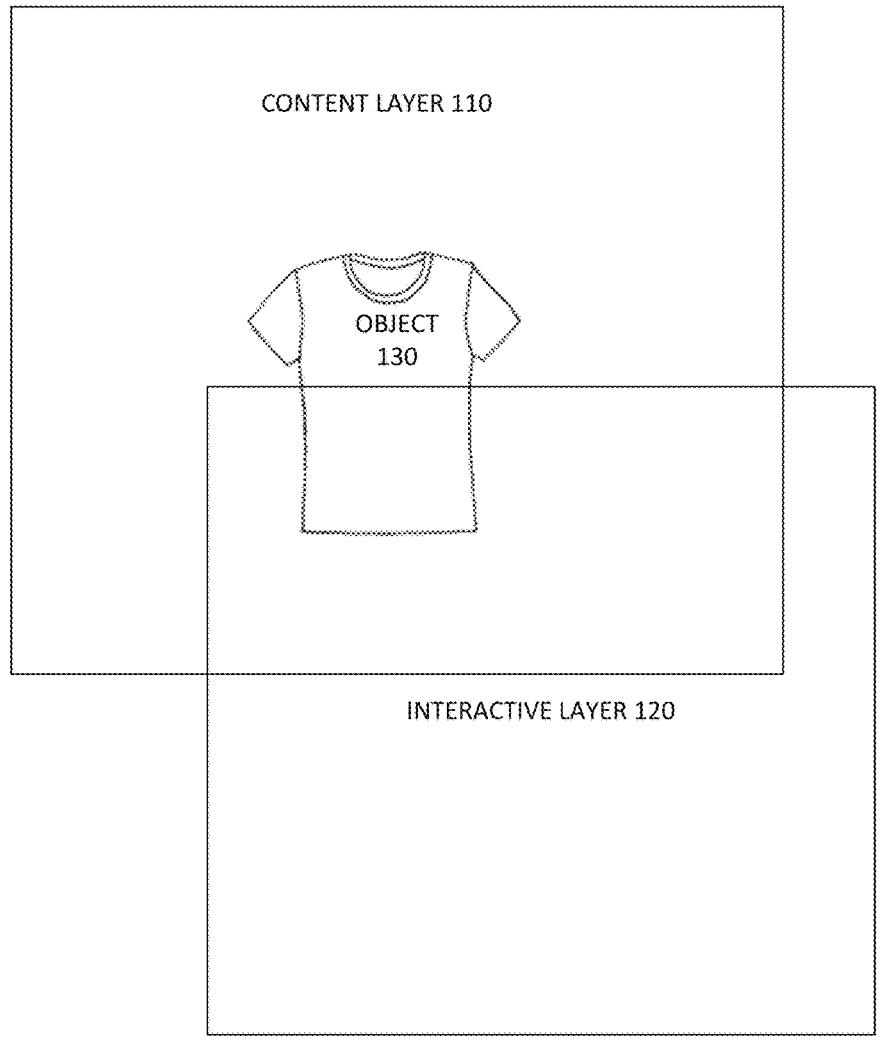
FIG. 1A illustrates elements of an augmented video.

FIG. 1A illustrates elements of an augmented video 100. The augmented video 100 generally includes multiple layered elements: an underlying content file 110 (e.g., the video file comprising a set of image frames) and an interactive layer that includes one or more interactive elements 120 (e.g., cue elements or canvas elements). For example, the content file 110 may be a video file in any format known in the art. The video file may include video image of various cue objects 130 (e.g., people, shirts and other clothing items, toys, cars, etc.). The cue object 130 displayed in the content layer can then be overlaid with an associated interactive layer that may include one or more interactive elements 120 with which the user can interact. Such interactive elements 120 may include added audio-visual elements (e.g., text, images, and video), game elements, and other types of augmenting content known in the art.

Depending on the type of interactive element 120, interaction may include use of various controllers (e.g., cursor, touchscreen, handheld controller) to trigger the interactive element associated with a specific part of the video element (e.g., the cue object 130 illustrated in the video). The interactive element 120 can be associated with specific triggers associated with the illustrated cue object 130. For example, where the cue object 130 is a shirt, a trigger may be associated with logos on the t-shirt, the name brand, or other visual indicators (e.g., buttons) associated with the cue object 130. The user may trigger such interactive element 120 by hovering over the cue object 130 (or associated visual indicator), selecting the cue object 130, or other interaction with the cue object 130.

Once triggered, the interactive element 120 may be executable to generate a display on the interactive layer as a pop-up (e.g., HTML pop-up) or other widget that can include additional information regarding the cue object 130 (e.g., different available sizes, colors, details, associated accessory or peripheral components, video of the cue object 130 in motion) or an interactive game. In other embodiments, the interactive element 120 can be hidden but may still be triggered if the user interacts with the associated aspect of the content (e.g. hovers cursor near or on the tire of the car). The latter embodiment (e.g. hiding the identifiable element) may be used as it may have a more aesthetically pleasing effect compared to the situation where various symbols are distributed on an advertisement. However, to inform that interactive elements are present, the content 110 may highlight the specific aspects of the product on display (e.g. tires, logos). The triggers for such interactive elements 120 may be customized to be displayed (in different types of displays) or hidden.

In some embodiments, the interactive element 120 may be further associated with portions of the area around the cue object 130 illustrated in the content layer, so that triggering may occur in response to input within a predetermined distance of the cue object 130. The interactive element 120 may similarly monitor and detect any user input (e.g. mouse cursor selection, touch input) within the associated area. For example, the interactive element 120 may be associated with an entire shirt being displayed on the content 110, as well as a portion of the background around the shirt. If the user provides input indicating any part of the associated shirt or surrounding portion, the interactive element 130 may be triggered to provide additional information or other augmenting content related to the shirt.

In the examples of providing the user with augmenting content when interacting with the interactive element 120, such augmenting content can be provided via a text window or a pop-up window. If the content layer 110 is a video, for example, the augmenting content may be implemented by pausing the video in the underlying content layer 110, then displaying the augmenting content via a pop-up window. Other embodiments associated with the interactive element 120 can also include providing hyperlinks to other websites or videos that include more details (e.g., where to buy, how to maintain/use, comparisons to other products) about the selected cue object 130, as well as rich media components (e.g. HTML) displayed about the product. In another embodiment, user selection of the interactive element 120 can also generate a three-dimensional model of the product that the user can interact with to get different views of the product from different angles and perspectives.

It is also possible to provide additional windows/menus that facilitate user purchase of the product upon selection of the interactive element 120. For example, after receiving additional information about the shirt (e.g. size and color), the user may be directed to a website or menu that provides the user an option to purchase the product.

In providing interactive elements 120 in association with the content 110 being displayed, it is also possible to add elements of video gameplay in order to encourage extended user interaction with the content file. Also referred to as gamification, the inclusion of video gameplay elements with the content 110 can include for example, instructing the user to perform some action for a period of time (e.g. finding and selecting a logo of the product that is initially hidden and continually moves randomly around the display, finding all logos on a display within a period of time). As the gameplay carries on during the period of time, a score can be tracked that corresponds to how well the user performs the action during the period of time. The outcome of the gameplay could be used to gauge whether the user was interested in the product. For example, based on a score threshold, a user score that is equal or greater than the threshold may denote that the user viewed the video and may be interested in the product being displayed in the content 110. If the score was lower than the threshold, this may be indicative that the user merely browsed the page or may have the page open idly. The party associated with the content 110 (e.g. advertiser) may then use this information in deciding whether to offer additional information about the product to the user. Furthermore, the score could also be used to determine if rewards (e.g., bonuses, discounts) should be offered to encourage the user to purchase the product—such as a discount (via a redeemable code or downloadable/printable coupon) if the product is purchased within a time period after viewing the current content.

In a distinct embodiment from advertisements (although similar in application), the use of the interactive elements 120 with the content 110 on display can be used for educational purposes as well. The content 110 may be associated with content being taught in a classroom (e.g. documentary of a historical event). The video file of the documentary may therefore be augmented with interactive elements 120 triggerable to display comments, prompts, questions, and other commentary from the class instructor. As the documentary is displayed to a student, various interactive elements may be included in the content that associates supplementary information about different people, objects, and locations of significance being displayed. The users, who may wish to obtain additional information about a person, object, or location, can select the different interactive elements to obtain the additional information. The additional information (e.g. text, three dimensional models, other websites) can then be provided to the user.

As noted above, the content file may include a set of one or more image frames illustrating a variety of people, objects, and locations. A specific object illustrated in the content file layer 100 may be designated as a cue object 130 and associated with an interactive element 120 in the interactive layer. The association between the cue object 130 and the interactive element 120 may be defined by metadata. Such metadata may track all the cue objects 130 illustrated in various frames of the content file and corresponding interactive elements 120, as well as how the cue object 130 are defined within the content file. Metadata defining the cue object 130 may therefore specify the specific frames (e.g., by start time and end time), shape of the cue object 130 (which may or may not correspond exactly to the shape of the illustrated object), any related visual indicators (e.g., highlighting, buttons), and the visual or interactive components to display/play. Meanwhile, the interactive layer may overlay display of the original content file, detect any input indicating any objects on display (which may or may not be associated with visual indicators), and activate the interactive elements 120 associated with such indicated objects.

Figure 1B:
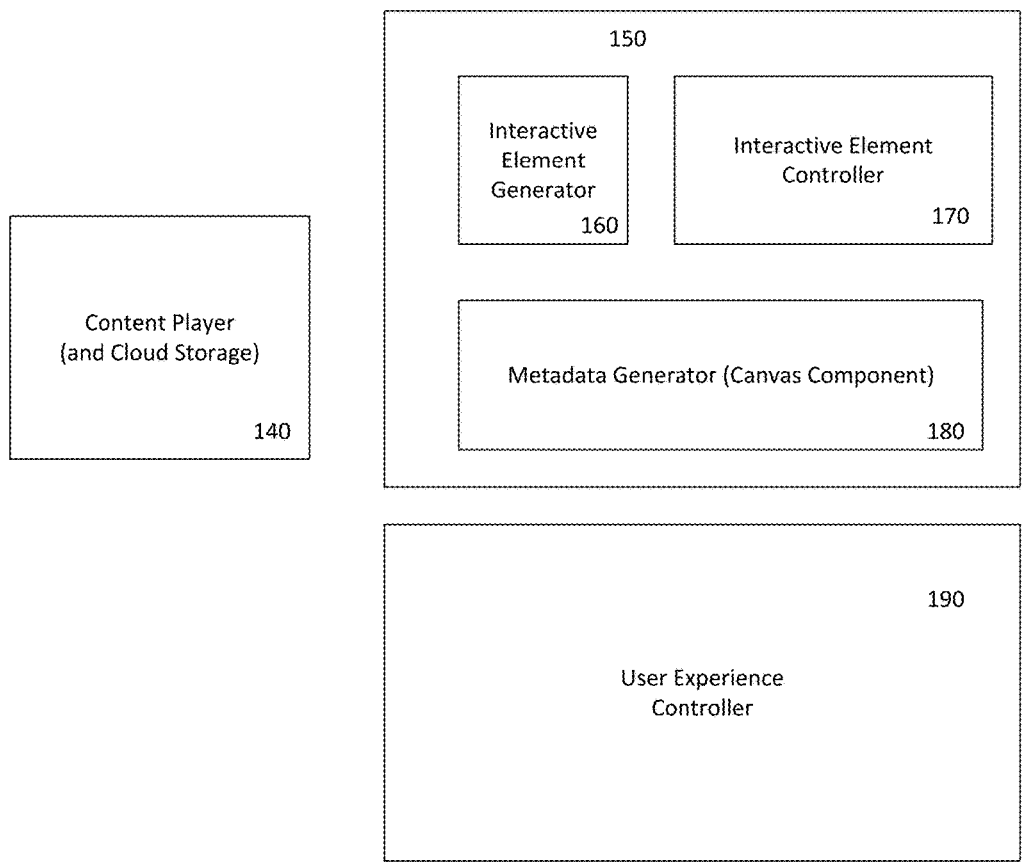
FIG. 1B illustrates an architecture associated with an augmented content experience.

FIG. 1B illustrates an exemplary architecture 130 associated with incorporating augmented content into a content file. The exemplary architecture 130—which may be implemented in a web browser—may include the content player 140, an interactive element application 150 executable to implement the interactive element with the content, and the user experience controller 190 from which users access and interact with the interactive content. Interactive element application 150 may include a number of different components used to associate selected interactive elements into the content file: an interactive element generator 160, an interactive element controller 170, and a metadata generator 180.

The content player 140 may be inclusive of any content player known in the art for displaying or playing content files of various formats. Content player 140 may include various controls that allow for playing, pausing, slowing, speeding, and other manipulations of content play. For example, content player 140 may be implemented in accordance with the HTML5 standard specification. In some embodiments, content player 140 may be associated with cloud storage for storing and/or hosting content files, whether associated with interactive elements or not. Such content files may be uploaded to cloud storage for playing, as well as augmenting with new interactive elements, modifying with different interactive elements, or other modifications as to which cue objects 130 are designated and which interactive elements 120 are associated.

The interactive element application 150 may be deployed in the Internet or cloud and accessible via a web-browser. In some embodiments, the interactive element application 150 may be a web-based tool (e.g., available through software-as-a-service) that can be accessed and executed without requiring download or installation. In an exemplary scenario where the designer wishes to augment a pre-existing video file with interactive elements, the designer may load their content file into the interactive element application 150, whether from cloud storage or another source.

Specifically, interactive element controller 170 may load the content file, as well as any currently associated metadata. If the content is a video, for example, metadata may generally indicate such characteristics as number of framers per second, rate of play, and time of play. The interactive element controller 170 may process the loaded content file into a set of image frames. If the content is an image, the interactive element controller 170 can process the image as a set of pixels or other type of sub-section.

Where the content is a video file, a timeline can be created by interactive element controller 170 that includes each individual frame of the video. The interactive element generator 160 may receive the input from the designer indicating a specific frame and a portion of the frame to define as a cue object 130. The indicated portion may correspond to an object (e.g., shirt or car) illustrated in such image frame. Image processing tools may be used to identify the boundaries of the illustrated object, which the designer may approve or otherwise alter (e.g., to select only a part of the object, include a buffer area surrounding the object). The defined cue object 130 may thereafter be associated with an interactive element 120. A variety of different types of interactive elements 120 may be made available for selection (e.g., boxes or windows for text, images, video, or gaming elements). The specific augmenting content may be specified (e.g., from stored augmenting content elements in cloud storage) or otherwise loaded by the designer. Based on the selected type, the interactive element generator 160 may then create the interactive element 120 executable to display the augmenting content upon being triggered by interaction with the cue object 130.

The illustrated object corresponding to the cue object 130 may be illustrated in multiple different frames, however. Image processing techniques may further be applied to identify other frames within the content file in which the object is further illustrated, as well as the specific portions of the identified frames that illustrate the object. In some embodiments, a set of candidate objects illustrated in the identified portions in the remaining frames may be presented to the designer for confirmation that each candidate corresponds to the originally indicated cue object. The designer may also modify the boundaries of the cue object 130 for each remaining frame. The confirmed cue objects 130 may thereafter be associated with the interactive element 120 in the same fashion discussed above. The interactive element 120 associated with the cue object 130 in one frame may be the same throughout all the frames in which the cue object 130 appears. Alternatively, a different interactive element 120 may be associated with different illustrations of the cue object 130. For example, a documentary video regarding a historical figure may be augmented with different details relevant to the beginning, middle, and end.

Once the cue object 130 has been identified within each of the set of frames, the designer can then select the specific type of interactive element 120 and provide the specific augmenting content to be displayed upon being triggered. As noted above, the augmenting content may include text, images, video, other interactive rich media content, hyperlinks, games, three-dimensional models, and menus and options for further actions. For each image identified in the analysis and processing of the content file, the designer can specify portions of the image as the cue object 130. Such specification may include confirmation of the boundaries and/or modification so as to identify the specific sub-section of the image (e.g., set of pixels or other subsection measurement) to be designated as the cue object 130 (e.g. logo or tires of a car).

For example, a generated timeline reflecting the set of frames identified in the content file may be presented via an interface associated with the interactive element controller 170. Such interface associated with the interactive element controller 170 may further allow the designer to confirm the selected cue object 130, modify the bounds of the cue object 130 as desired, select a visual indicator as desired (e.g., remain hidden, highlighting, indicator shape/symbol), select a type of interactive element 120 for association, provide the specific augmenting content, and specify whether and how the display of the content file behaves when the augmenting content is triggered (e.g., paused, altered play speed, relative display size, minimization).

The interactive element controller 170 (via use of artificial intelligence and image processing algorithms) can also search for the identified cue objects 130 within other frames. The designer can subsequently confirm the subsequent search performed by the processor but also can manually identify the cue object 130 in other frames as well, if the interactive element controller 170 is unable to locate the cue object 130 and omitted a frame from the subset of frames identified with candidate objects.

Metadata generator 180 is used to generate new metadata for the content file. Such metadata specifically associates each identified cue object 130 with a specified interactive element 120 during play of the content file such that when user interaction directed at the cue object 130 is detected, the interactive element 120 is triggered to display the associated augmenting content. Such metadata generated by the metadata generator 180 tracks all the interactive elements 120 associated with the respective cue objects 130 in the content file. Metadata may be provided for a frame or set of frames of the content file based on the implementation of interactive elements and augmenting content.

As such, the metadata generator 180 generates metadata that couples the content file, the defined cue objects 130 therein, respective interactive elements 120, and respective augmenting content together. Furthermore, the metadata further specifies how the content file is to be played during augmentation, as well as how the interactive elements 120 and augmenting content appear in relation to the content file and in response to user input or interaction. The metadata may be provided for a frame or set of frames of the augmented content based on the selected implementation of interactive elements within the augmented content.

Once the metadata has been generated, the metadata (inclusive of the selected interactive elements 130 and associated augmenting content) may be incorporated into and/or stored in association with the content file in cloud storage (e.g., associated with content player 140). The content file that has been augmented with the augmenting content may then be published such that one or more users can access and interact with the content file (e.g., over the Internet) using user experience controller 190. Publication may include generating a hyperlink to the cloud server that is hosting the augmented content file. Such hyperlink may be selectable to direct a web browser to the hosted location of the augmented content file. The associated content player 140 may allow requesting users to play and interact with the augmented file including the interactive elements 130 via the browser.

Meanwhile, user experience controller 190 may detect user input or interaction during play of the augmented content file. Information regarding the detected user input or interaction (e.g., location of user input or interaction within the display) may be indicative of a cue object 130. Such user input or interaction may therefore trigger the interactive element 120 associated via the metadata with the cue object 130. The interactive element 120 may therefore be triggered to augment the display of the content file with the augmenting content. The augmenting content display may be displayed in accordance with the designer selections as reflected in the generated metadata.

The user application 190 uses the metadata in order to identify the presence and location of the interactive elements 120 within the augmented content file and monitor for user input or interaction relating to the defined cue objects 130. Furthermore, the user application 190 also uses the metadata to control the display of the augmented content file, interactive elements 120, and the augmenting content in accordance with the custom selections of the designer.

The user experience controller 190 enables user access and interaction with the augmented content file. Since the augmented content file may be published for access by any number of different computing devices—each of which may have different capabilities—various compatibility plugins and codecs may be made available via user experience controller 190 to provide a consistent user experience. Through the user application 190, the capabilities of each computing device may be supplemented (if needed) in order to enable play of the specific content file and related interactive elements 120 and augmenting content. For example, the user experience controller 190 may include related software modules that facilitate loading of the augmented content file, loading the metadata incorporated therein, displaying/playing the augmented content file, monitoring for user input or interaction, detecting user input or interaction that triggers an interactive element, loading the associated interactive element specified by the metadata, and displaying the augmenting content associated with the loaded interactive element.

Figure 2:
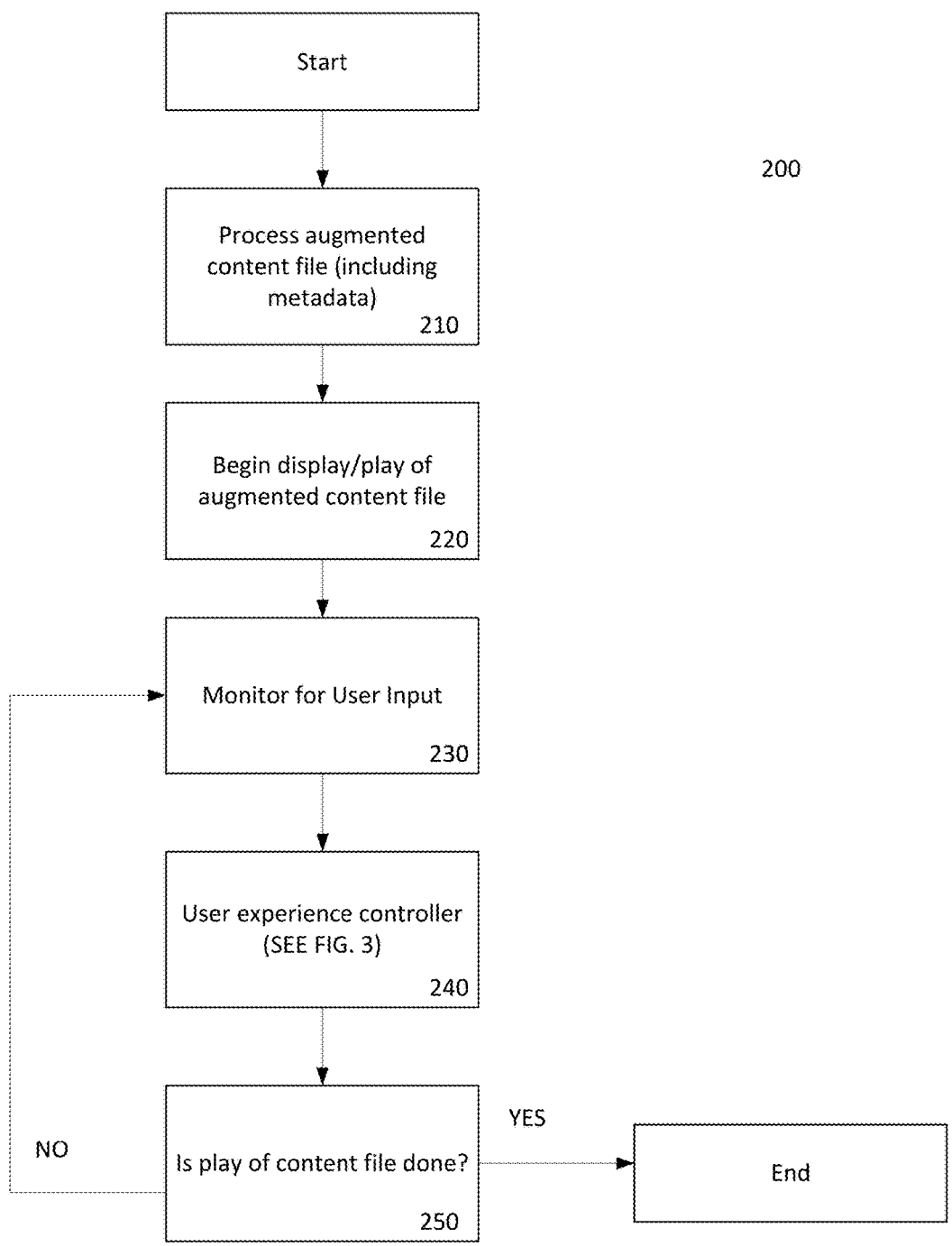
FIG. 2 is a flowchart that illustrates steps of user interaction with the augmented content.

FIG. 2 is a flowchart 200 that illustrates an exemplary method for deploying an augmented content file in accordance with the present invention.

In step 210, the interactive elements implemented in the augmented content file are defined and incorporated into the file via the generated metadata. The metadata may be used to specify how the interactive elements behave, appear, how user selection of the interactive elements affect the underlying content, and how the augmenting content is displayed.

In step 220, the augmented content file is displayed. As illustrated in FIG. 1A, the augmented content file may include a content layer in which the original underlying content file is played and another layer (interactive or canvas layer) associated with detecting user interaction and deploying interactive elements in response.

In step 230, the user experience controller may be continually monitoring the interactive layer for user input. Where detected user input is identified as corresponding to a cue object, an interactive element incorporated in the augmented content may be triggered. Selection of the cue object, for example via mouse-click or touch on a touchscreen), may be identified by reference to the corresponding metadata, which further specifies the interactive element that is triggered.

In step 240, the metadata allows for an interactive element to be identified and triggered. Further details regarding the steps related thereto are provided below in relation to FIG. 3.

In step 250, it is determined whether play of the content file is complete. After the user experience controller finishes processing a user input, the user experience controller can continue monitoring for more user input that may be associated with different cue objects 130 in step 250 until play of the augmented content file is complete (e.g., the video ends).

Figure 3:
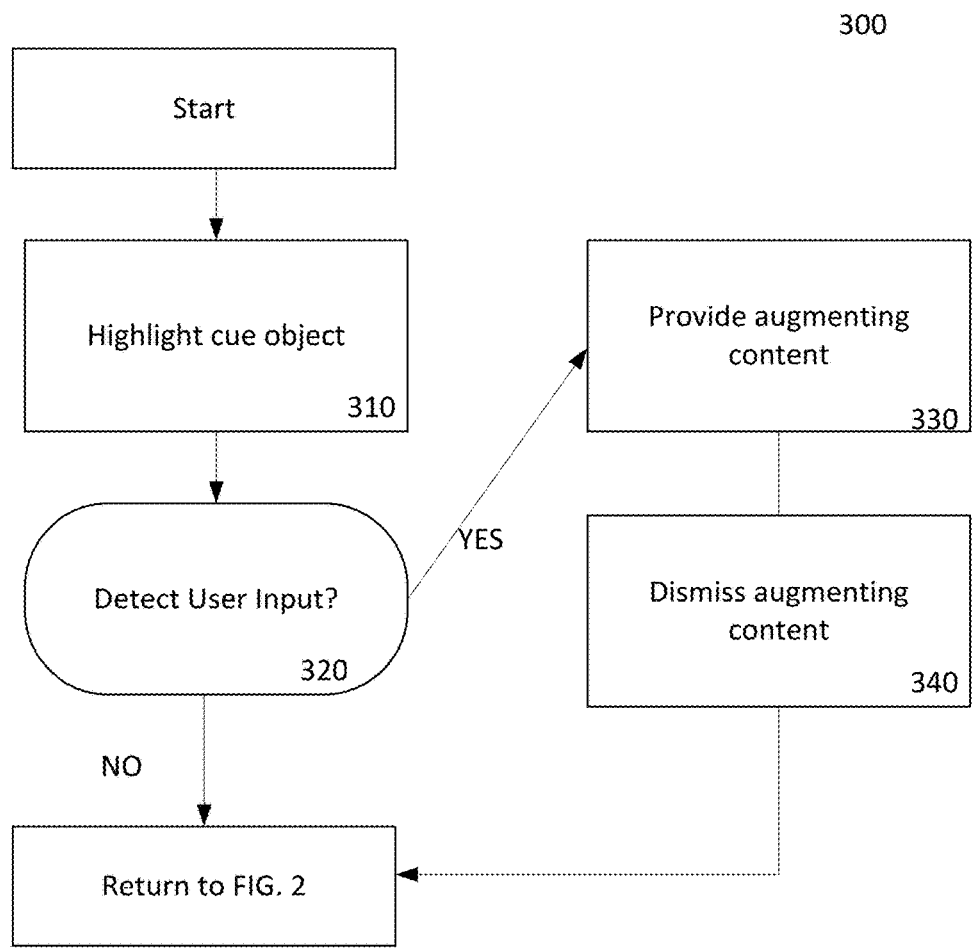
FIG. 3 is a flowchart that illustrates steps of the user application in connection with the user interaction of FIG. 2.

FIG. 3 is a flowchart 300 that illustrates a method for implementing an interactive element such as may occur during deployment of the augmented content file in FIG. 2.

In step 310, the user experience controller has begun monitoring the interactive layer for user input associated with the augmented content file. During play of the augmented content file, one or more cue objects 130 may be displayed and indicated as such by visual highlighting or other indicators. Such highlighting or visual indicators are indicative of the availability of augmenting content to be displayed once the interactive element is triggered. In an embodiment, the user experience controller may be a web-based tool accessible over the Internet or in the cloud. The user experience controller may monitor user activity in a browser and determine if the user has selected a displayed and highlighted cue object associated with an interactive element in the augmented content file. The user experience controller knows the location of each of the cue objects associated with interactive elements within the augmented content file based on the metadata loaded. Using the metadata information, the user experience controller is able to detect when user activity (e.g. cursor movement, touch screen) is near one or more cue objects. In some embodiments, user selection of a cue object may include a mouse-click or a touch on a touchscreen.

In step 320, user selection of a cue object may be detected. This generally corresponds to a user input or interaction that indicates a specific cue object 130 (e.g. product, person, location) being illustrated in the current frame of the content file. As described above, such indication of a cue object can be detected based on user activity at computing device. For example, the user may select a cue object by using a mouse, keyboard, or touchscreen. As to the latter, the user may utilize touchscreen features and physically touch a portion of the display corresponding to where the cue object is located. The user may also be able to select the cue object by selecting from a menu of options (different cue objects in the image frame).

Other means—such as gestures and voice commands—are also possible in order to provide hands-free ways for users to locate and select cue objects within the augmented content file. For example, users may provide a voice command identifying a generic term for the cue object 130 within the augmented content file (e.g. show me details about the shirt or shoes). This could be identified as selection of the cue object 130 associated with the interactive element.

It is also possible to instruct the user experience controller to automatically initiate user selection if the user cursor or touchscreen activity is within a predetermined distance for a pre-determined period of time. If, for example, the user cursor is next to a cue object for more than thirty seconds, the user experience controller may interpret such proximity as an indication of interest in the illustrated cue object.

Once user selection of the cue object has been detected, the user experience controller may render the associated augmenting content based on the metadata for display in step 330. The metadata that is associated with the selected cue object is used to identify what type of interactive element has been triggered, the augmenting content to be displayed, and the manner of such display and interaction with such display. The metadata also specify how the underlying augmented content file is to be displayed during execution of the interactive element and concurrent display of augmenting content.

The augmenting content is displayed until the user dismisses or otherwise stops the display of the augmenting content in step 340. The dismissal or stop may be based on an explicit action by the user (e.g., closing the window displaying the augmenting content). The dismissal can also occur after a pre-determined period of time or upon completion of play of the augmenting content. In some embodiments, the selection of another cue object can indicate that the currently displayed augmenting content is to be dismissed. However, it is also possible to have the user experience controller manage display of different augmenting content simultaneously. The number of different augmenting content window that can be displayed simultaneously may be customized by the end-user.

After the user dismisses the augmenting content (or if no user input has been detected), the user experience controller can continue monitoring for more user input until the augmented content file ends play (e.g. video is done playing).

Figure 4:
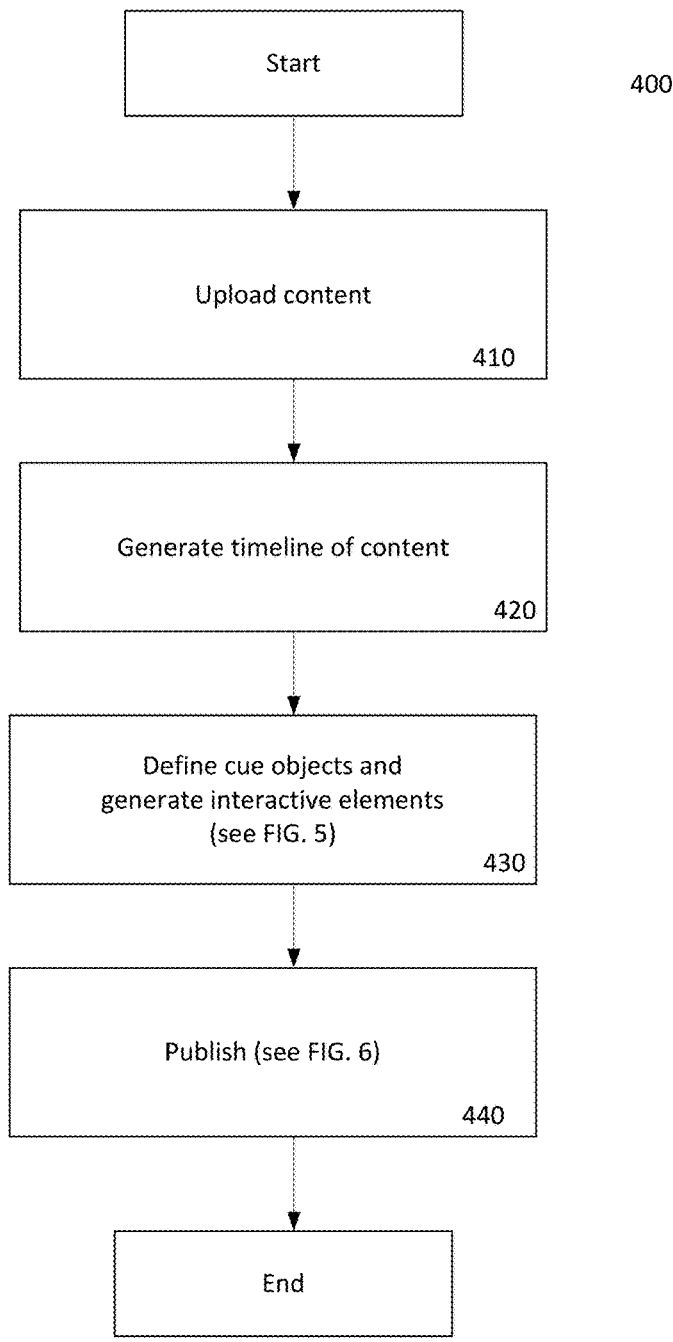
FIG. 4 is a flowchart that illustrates steps for creating augmented content.

FIG. 4 is a flowchart 400 that illustrates a method for creating a new augmented content file in accordance with the present invention.

In step 410, the designer can upload a content file to the interactive element application or cloud storage. The content file can be, for example, an image or a video. Specifically, the content file can include a pre-existing advertisement that may or may not have associated interactive elements. Either way, the present method 400 allows for further interactive elements to be incorporated to update or otherwise supplement the content file.

If the content file is a video file, the interactive element application may process the content file to generate a timeline illustrating multiple individual frames in step 420. The designer may select a frame from the time line and define a portion of the selected frame to serve as a cue object 130 that triggers an associated interactive element. Such defined portion may or may not correspond precisely to an illustrated object within the frame. The designer may further define what augmenting content is displayed upon triggering of the interactive element in step 430. Details related to the defining of the interactive elements are provided below in FIG. 5. The definitions performed in step 430 may include specifically what portion of the frame is defined as the cue object 130 (e.g., bounds of the cue object), type of interactive element to be associated, what augmenting content is associated with the interactive element, and how the interactive element, augmenting content, and original content file are displayed before, during, and after triggered display of the interactive element and augmenting content. As noted above, generated metadata specifies what cue object is associated with what interactive element and specified augmenting content, as well as how the respective displays of each are presented and behave.

In step 440, the designer can choose to publish the augmented content file (now including metadata specifying one or more triggerable interactive elements). Further details regarding the steps for publishing the augmented content are provided below in FIG. 6.

Figure 5:
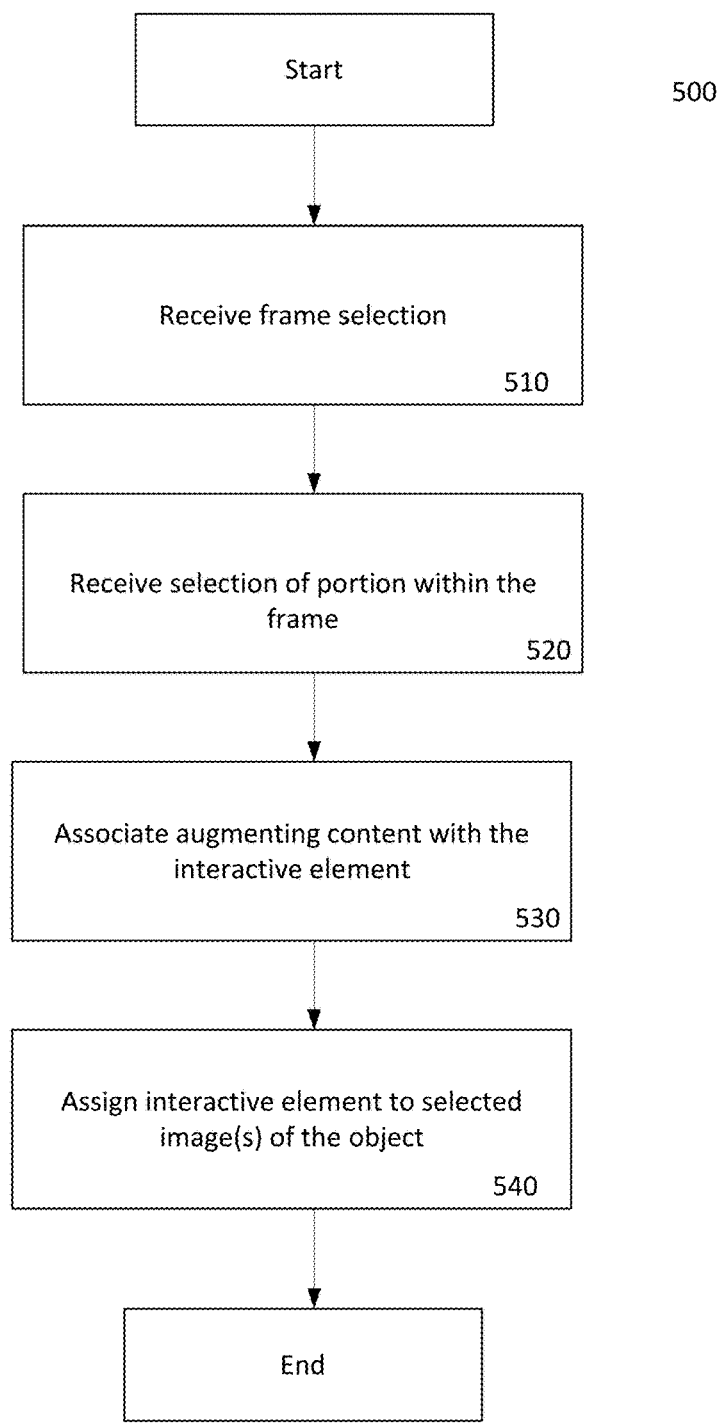
FIG. 5 is a flowchart that illustrates steps for defining interactive elements.

FIG. 5 is a flowchart 500 that illustrates a method for generating new interactive elements.

In step 510, the designer can select a period of time within the timeline of the content file. The selected period of time may correspond to a set of image frames displayed during play of the content file.

In step 520, the designer may identify the cue object 130 that may be associated with the interactive element at a first time (or in one frame). For example, if the designer wishes to associate an interactive element with a shirt being displayed in a video advertisement, the designer may identify an illustration of that shirt appearing in one of the set of frames.

In step 530, the designer may associate the augmenting content that may correspond to the type of interactive element for that cue object 130. For example, the augmenting content can include images, text, video, audio, game, etc., that can be played or otherwise presented to the user that triggers the cue object 130. Augmenting content for a shirt that may be associated with the interactive element could include text identifying the different colors available, fit and sizing, brand, accessories, etc. The augmenting content may also include other images providing different views of the shirt or a three-dimensional model of the shirt.

In step 540, the same or different interactive element can then be assigned to each illustration of the cue object 130 identified within the set of frames corresponding to the period of time selected in step 510. For example, the same interactive element may be assigned to every illustration of the cue object 130, notwithstanding any differences in perspectives and angles. For example, if the shirt is shown during the first fifteen seconds of a thirty second video, the interactive element can be assigned to each frame illustrating the cue object 130 in those first fifteen seconds. Alternatively, a series of different interactive elements may be associated to each illustration such that one interactive element may be associated with information content, and another interactive element may be associated with a game or other activity.

The assignment of the interactive element to each illustration of the defined cue object can be performed a number of different ways. The designer can manually go through each frame in the period of time on a frame-by-frame basis and make the association between the cue object 130 and the interactive element. Alternatively, an image processing algorithm may be executed to identify the different frames within the set that illustrate the defined cue object 130. Such illustrations may be designated candidate objects prior to confirmation by the designer, at which point each confirmed cue object may be further associated with the same or different interactive elements and augmenting content.

Figure 6:
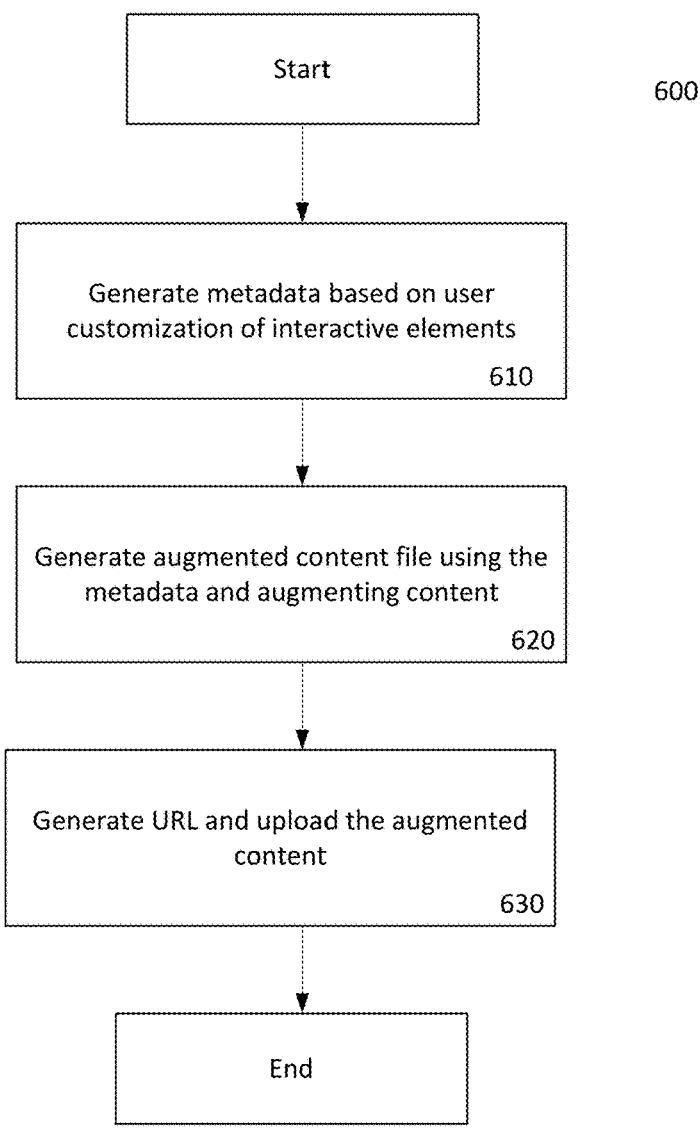
FIG. 6 is a flowchart that illustrates how augmented content are published.

FIG. 6 is a flowchart that illustrates a method for finalizing and publishing an augmented content file in accordance with the present invention.

In step 610, metadata is generated by the interactive application based on the interactive elements associated with the content file (see FIG. 5). The metadata contains information regarding the interactive elements and how such interactive elements are implemented to display augmenting content in connection with the content file. The metadata also includes references to the augmenting content that may be displayed when one of the interactive elements are triggered via selection or interaction with a cue object.

In step 620, a new augmented content file is generated based on the generated metadata defining cue objects, interactive elements, and the augmenting content. The generated augmented content file (and related assets such as the augmenting content) can then be hosted at a particular website or database in step 630. A URL can be generated that references the location where the augmented content is stored. The URL can also be provided to others or implemented/embedded to other websites. Users who access the augmented content file through the URL may be able to view the underlying content file with the interactive elements and augmenting content that have been incorporated. The augmented content file may allow users to obtain additional information related to any number of different aspects shown in the content file by triggering a corresponding interactive element associated with a defined cue object.

FIG. 7-FIG. 10 illustrate different exemplary interfaces associated with an interactive element application that designers can use to augment content files with interactive elements as described above. Details relating to the features associated with the interface will be provided below.

Figure 7:
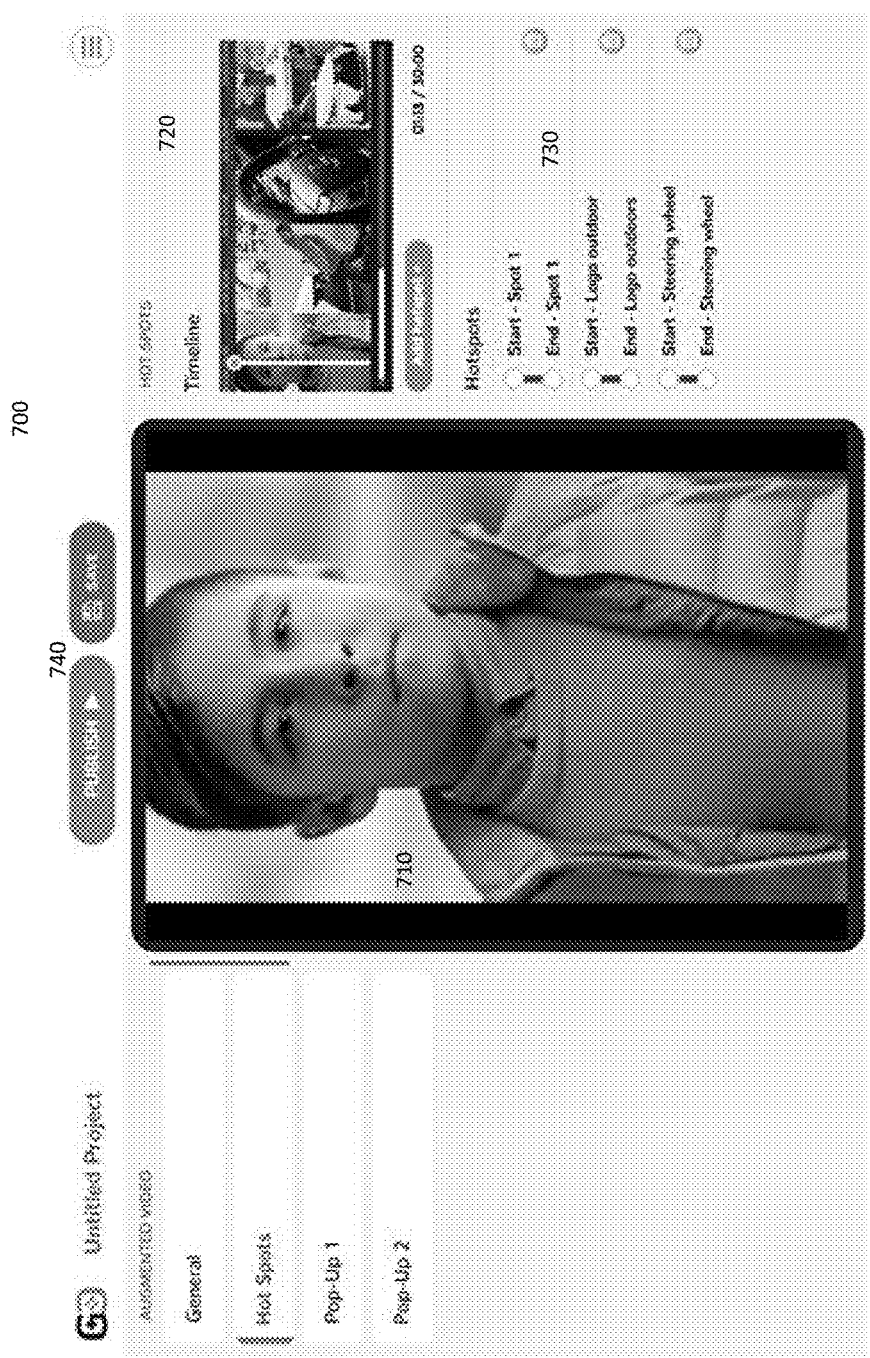
FIG. 7 is an interface for creation of augmented content.

FIG. 7 is an interface 700 for creation of augmented content files. The interface is accessible by the designer on their computing device via a web-based tool for creating the augmented content file (e.g., interactive element application). The web-based tool allows the designer to upload content files, identify portions of an image frame to be tagged as cue objects for associated interactive elements, and provide augmenting content for display upon triggering of the interactive elements.

As illustrated in FIG. 7, the interface 700 includes a current display of an image frame 710 of the content file. If for some reason the designer may like to tag a portion of the content (e.g. the person's shirt), the display 710 can be used to identify the portion to be tagged with an interactive element.

The interface 700 may also include a timeline interface 720. If the content is a video file, the timeline interface 720 corresponds to the duration of the video file. Selection of a particular time on the timeline can provide the frame corresponding to a selected point in time within the video file. That frame can be displayed in the display 710.

Furthermore, the timeline interface 720 may also indicate a number of 'hotspot' designations 730. The 'hotspot' designations may correspond to time periods identified as including images corresponding to an identified cue object 130. The designer may identify a start and end time (e.g., a range) within the duration of the content file to search for the cue object 130. The range of time may be used by the interactive element application to identify images of the cue object 130 within the range. For example, if the shirt appears in the video clip during the first fifteen seconds of a thirty second range, the identified images may include every image frame within the specified fifteen seconds. The interface may further suggest modifications to the search parameters or otherwise indicate if the processor (executing image processing algorithms) is able to locate other images of the cue object 130 outside of the defined range of time.

Publish and save features 740 may also be provided so that once the creation of all desired interactive elements is complete, the augmented content file may be stored in memory (e.g., cloud database or server) and published or otherwise made available to one or more users.

Figure 8:
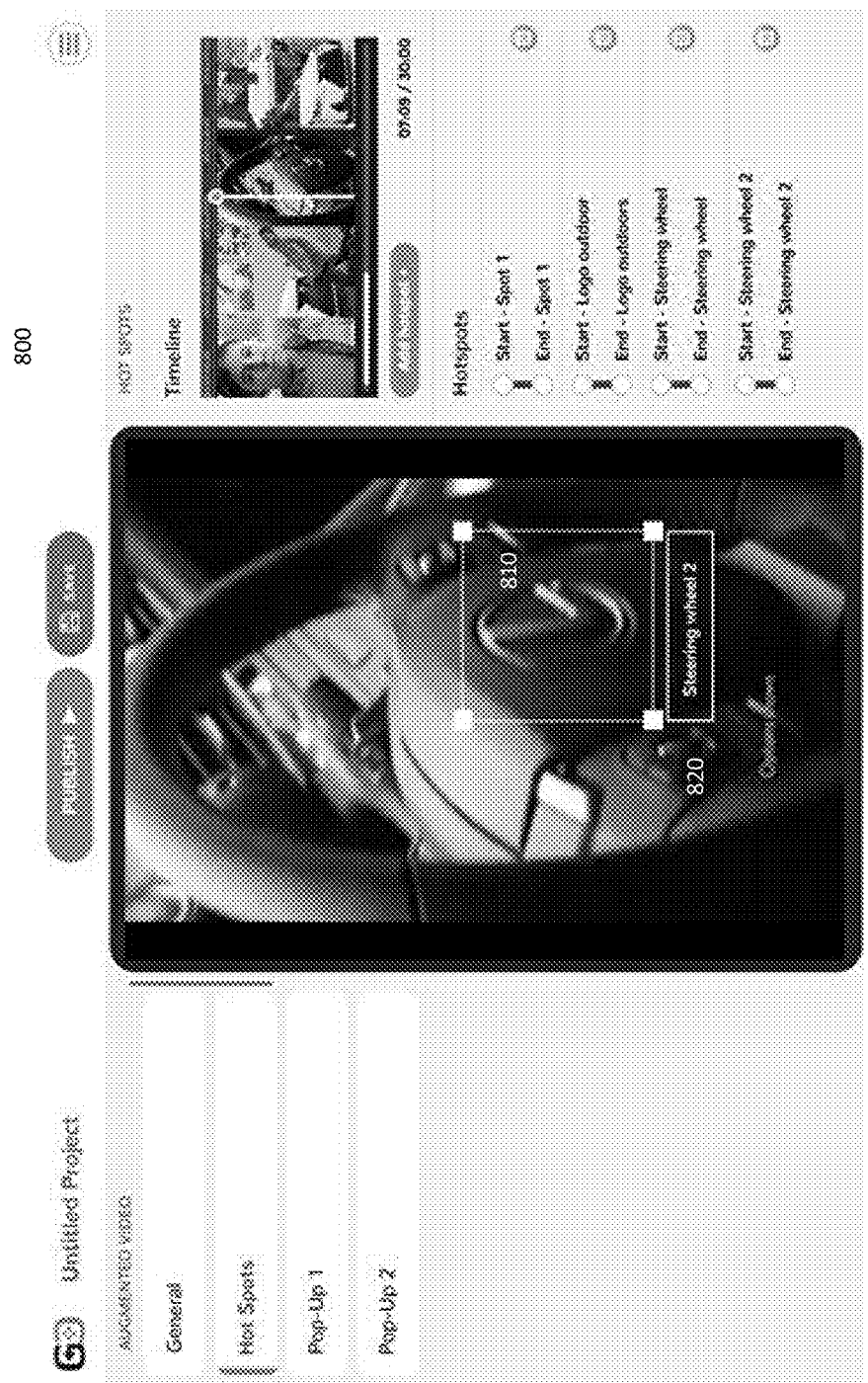
FIG. 8 illustrates user set up of interactive element definitions.

FIG. 8 illustrates an interface 800 for defining cue objects. The interface 800 illustrated allows designers to indicate specific portions of the image frame as a cue object for triggering the interactive element. For example, the display portion of the interface allows the designer to indicate a portion 810 of the image to be defined as the cue object associated with an interactive element. Such indication may be received by way of partitioning the display (e.g., via a box) that indicates that the portion 810 of the content within the box is what should be associated with the interactive element. The indicated portion 810 can be defined based on input received via a keyboard, mouse, or touchscreen. The boundaries of the indicated portion 810 can be moved and/or modified into different shapes to define the cue object 130, which may or may not correspond to the shape of the illustrated object. In this case, the indicated portion 810 defines the cue object as a square enclosing a logo of a car found on the steering wheel.

The label 820 can be used to identify the specific interactive element that corresponds to the cue object defined by the indicated portion 810. Since the image frame may include multiple cue objects and interactive elements, labeling each interactive element may be helpful in distinguishing between the interactive elements within the same frame.

Figure 9:
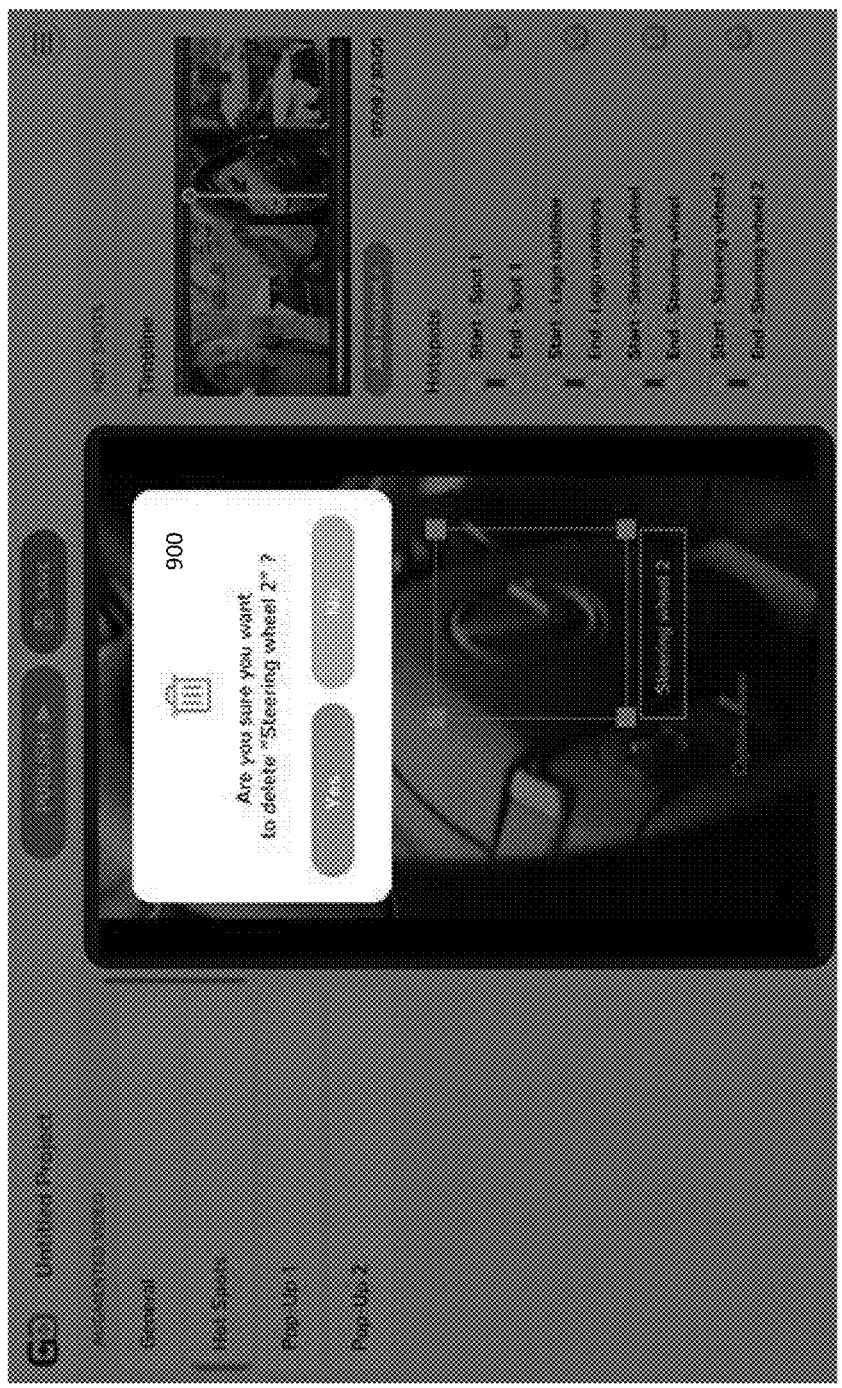
FIG. 9 illustrates an interface where the user can delete interactive element definitions.

FIG. 9 illustrates an option for deleting interactive element definitions. When the designer indicates a wish to delete an interactive element, a prompt 900 is shown to confirm the requested deletion. As such, the prompt 900 requests confirmation (via yes/no selection) that the deletion is intended.

Figure 10:
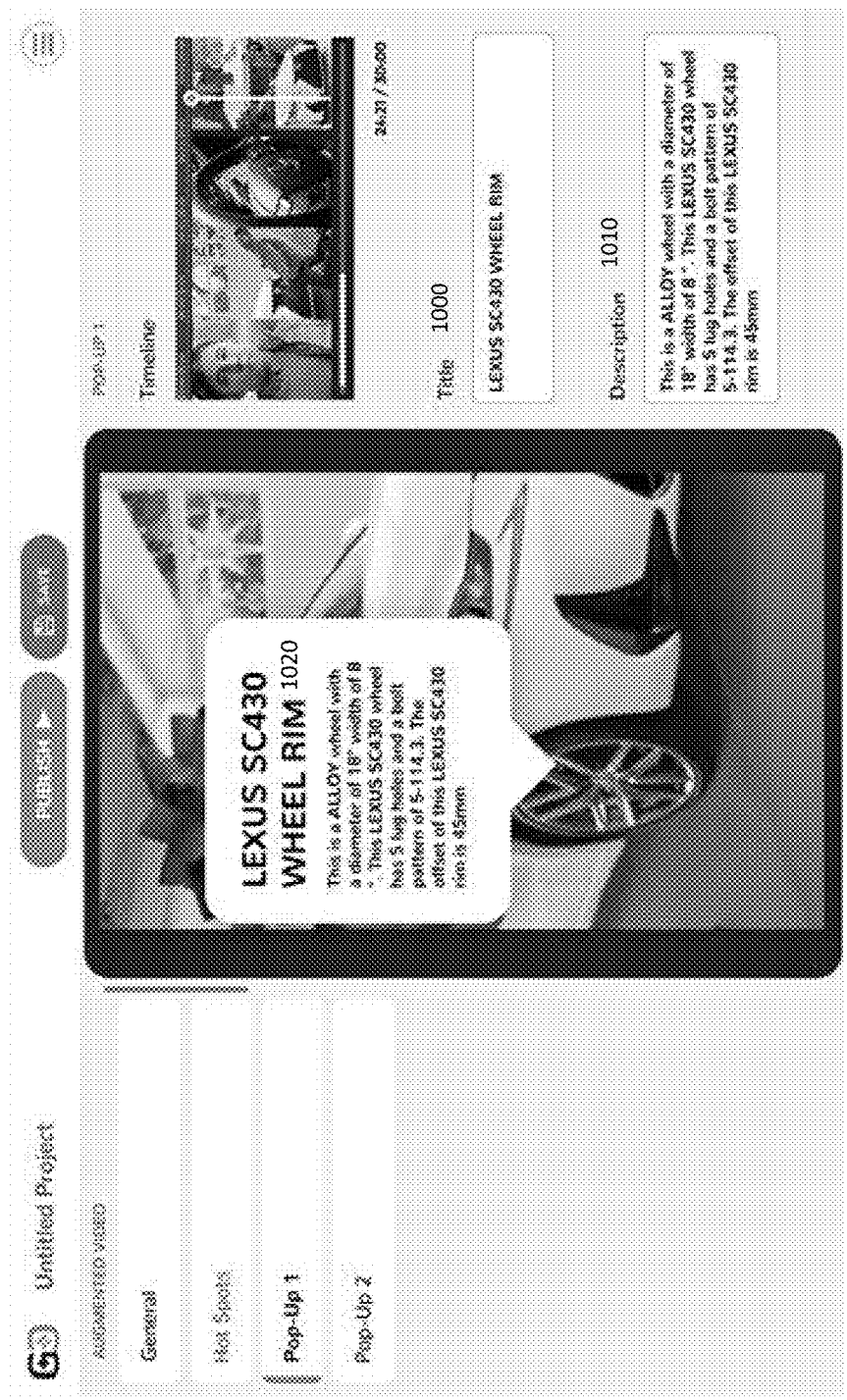
FIG. 10 illustrates an interface where the user can add additional details for a product related to the interactive element.

FIG. 10 illustrates an interface for inputting augmenting content to be displayed upon triggering of the interactive element. After the designer has defined the bounds of the cue objects 130 and selected a type of interactive element (e.g., pop-up window) in the interface of FIG. 8, the augmenting content may be indicated or inputted. For example, the cue object 130 associated with the interactive element 1000 may be titled in title field 1000 and associated with augmenting content entered in the augmenting content field 1010. Although the interface illustrates fields as text boxes, it may be possible for the designer to indicate augmenting content by reference to other sources (e.g. websites, database files) where such augmenting content may be hosted or stored. As such, the augmenting content field 1010 may receive content in forms other i than plain text. For example, the designer may upload videos, three-dimensional models, or hyperlinks to other windows, menus, or websites.

Once the augmenting content is entered or indicated, a display 1020 could provide a preview that illustrates how the augmenting content would appear if the corresponding interactive element is triggered. If no further changes need be made to the preview 1020, the augmented content file—now with associated metadata regarding interactive elements defined based on cue objects and augmenting content—may be saved and/or published.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed:

1. A method for augmenting content with interactive elements, the method comprising:
   receiving an uploaded content file over a communication network;
   generating a timeline for the uploaded content file, wherein the generated timeline includes a plurality of images from the uploaded content file;
   receiving input indicating a cue object illustrated in at least one of the images on the generated timeline and a selected interactive element;
   analyzing a remaining set of the images from the generated timeline of the uploaded content file to identify a subset of the images that also illustrate the indicated cue object;
   generating metadata that associates the indicated cue object illustrated in the at least one image and in the identified subset of images with the selected interactive element; and
   updating the uploaded content file to include the selected interactive element and the generated metadata, wherein the selected interactive element is executable to detect an interactive trigger and to augment the at least one image and the identified subset of images with interactive data based on the detected interactive trigger.

2. The method of claim 1, wherein the uploaded content file is a video file.

3. The method of claim 1, wherein analyzing the remaining set of images includes executing an image processing algorithm that applies artificial intelligence to identify the indicated cue object illustrated in a different context than in the at least one image.

4. The method of claim 3, further comprising:
   identifying a candidate cue object illustrated in the remaining set of images; and
   requesting confirmation that the candidate cue object illustrates the indicated cue object in the different context, wherein generating the metadata is further based on the confirmation.

5. The method of claim 1, further comprising:
   storing the updated content file at a location accessible over the communication network; and
   generating a URL of the location, wherein the updated content file is accessible by one or more user devices over the communication network.

6. The method of claim 1, wherein the interactive data includes augmenting content, and wherein the generated metadata further specifies that the augmenting content to be displayed in augmenting the at least one image.

7. The method of claim 6, wherein the generated metadata further specifies how to display the augmenting content simultaneously with a display of the uploaded content file.

8. The method of claim 7, wherein the generated metadata further specifies that the display of the uploaded content file is paused while the augmenting content is overlaid over the display of the uploaded content file.

9. The method of claim 6, wherein the augmenting content includes an executable game.

10. A system for augmenting content with interactive elements, the system comprising:
    a communication interface that receives an uploaded content file over a communication network;
    a processor that executes instructions stored in memory, wherein execution of the instructions by the processor:
       generates a timeline for the uploaded content file, wherein the generated timeline includes a plurality of images from the uploaded content file;
       defines a cue object illustrated in at least one of the images on the generated timeline and a selected interactive element;
       analyzes a remaining set of the images from the generated timeline of the uploaded content file to identify a subset of the images that also illustrate the indicated cue object;
       generates metadata that associates the indicated cue object illustrated in the at least one image and in the identified subset of images with the selected interactive element; and
    memory that stores the uploaded content file, wherein the uploaded content file has been updated to include the selected interactive element and the generated metadata, wherein the selected interactive element is executable to detect an interactive trigger of the defined cue object and to augment the at least one image and the identified subset of images with interactive data based on the detected interactive trigger.

11. The system of claim 10, wherein the uploaded content file is a video file.

12. The system of claim 10, wherein the processor analyzes the remaining set of images by executing an image processing algorithm that applies artificial intelligence to identify the indicated cue object illustrated in a different context than in the at least one image.

13. The system of claim 12, wherein the processor executes further instructions to:
- identify a candidate cue object illustrated in the remaining set of images; and
- generate a prompt requesting confirmation that the candidate cue object illustrates the indicated cue object in the different context, wherein generating the metadata is further based on the confirmation.

14. The system of claim 10, further comprising a cloud server that stores the updated content file at a location accessible over the communication network; and wherein the processor executes further instructions to generate a URL of the location, wherein the updated content file is accessible by one or more user devices over the communication network.

15. The system of claim 10, wherein the interactive data includes augmenting content, and wherein the generated metadata further specifies that the augmenting content be displayed in augmenting the at least one image.

16. The system of claim 10, wherein the generated metadata further specifies how to display the augmenting content simultaneously with a display of the uploaded content file.

17. The system of claim 16, wherein the generated metadata further specifies that the display of the content file is paused while the augmenting content is overlaid over the display of the uploaded content file.

18. The system of claim 15, wherein the augmenting content includes an executable game.

19. A non-transitory computer-readable storage medium, having embodied thereon a program executable by a processor to perform a method for augmenting content with interactive elements, the method comprising:
- receiving an uploaded content file over a communication network;
- generating a timeline for the uploaded content file, wherein the generated timeline includes a plurality of images from the uploaded content file;
- receiving input indicating a cue object illustrated in at least one of the images on the generated timeline and a selected interactive element;
- analyzing a remaining set of the images from the generated timeline of the uploaded content file to identify a subset of the images that also illustrate the indicated cue object;
- generating metadata that associates the indicated cue object illustrated in the at least one image and in the identified subset of images with the selected interactive element; and
- updating the uploaded content file to include the selected interactive element and the generated metadata, wherein the selected interactive element is executable to detect an interactive trigger and to augment the at least one image and the identified subset of images with interactive data based on the detected interactive trigger.

* * * * *